United States Patent
Mori

(10) Patent No.: US 8,066,322 B2
(45) Date of Patent: Nov. 29, 2011

(54) VEHICLE BODY STRUCTURE

(75) Inventor: Takeo Mori, Susono (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 71 days.

(21) Appl. No.: 12/446,510

(22) PCT Filed: Dec. 13, 2007

(86) PCT No.: PCT/IB2007/004245
§ 371 (c)(1),
(2), (4) Date: Apr. 21, 2009

(87) PCT Pub. No.: WO2008/075200
PCT Pub. Date: Jun. 26, 2008

(65) Prior Publication Data
US 2010/0314905 A1  Dec. 16, 2010

(30) Foreign Application Priority Data
Dec. 18, 2006  (JP) .................................. 2006-340458

(51) Int. Cl.
*B62D 25/00* (2006.01)
(52) U.S. Cl. ............... 296/187.03; 296/209; 296/187.12
(58) Field of Classification Search .................. 296/209, 296/203.03, 193.05, 187.01, 187.03, 187.05, 296/187.12, 187.02
See application file for complete search history.

(56) References Cited

U.S. PATENT DOCUMENTS

| | | | |
|---|---|---|---|
| 4,996,634 A * | 2/1991 | Haneda et al. | 362/505 |
| 6,003,274 A * | 12/1999 | Wycech | 52/232 |
| 6,189,953 B1 * | 2/2001 | Wycech | 296/187.02 |
| 6,247,287 B1 | 6/2001 | Takabatake | |
| 6,321,793 B1 | 11/2001 | Czaplicki | |
| 6,896,320 B2 * | 5/2005 | Kropfeld | 296/203.01 |
| 7,140,668 B2 * | 11/2006 | Wesch et al. | 296/187.02 |
| 7,192,071 B2 * | 3/2007 | Watanabe et al. | 296/30 |

FOREIGN PATENT DOCUMENTS

| | | |
|---|---|---|
| JP | 01-111068 U | 7/1989 |
| JP | 09-020267 A | 1/1997 |
| JP | 10-244970 A | 9/1998 |
| JP | 2001-071949 A | 3/2001 |
| JP | 2005-247066 A | 9/2005 |
| JP | 2006-200703 A | 8/2006 |
| WO | WO 02/26551 A1 | 4/2002 |
| WO | WO 2007/082677 A | 7/2007 |

* cited by examiner

*Primary Examiner* — Dennis Pedder
(74) *Attorney, Agent, or Firm* — Kenyon & Kenyon LLP

(57) ABSTRACT

A bulkhead and a bulkhead are provided in a rocker so that a portion of the rocker, which portion is subject to bending due to buckling, is positioned between the bulkheads. If the portion of the rocker is bent due to buckling, for example, at the time of vehicle collision, a bulkhead is caught between the bulkheads, and absorbs a load applied to the bulkheads. In this way, when the rocker is deformed, the load is absorbed by the bulkhead.

7 Claims, 5 Drawing Sheets

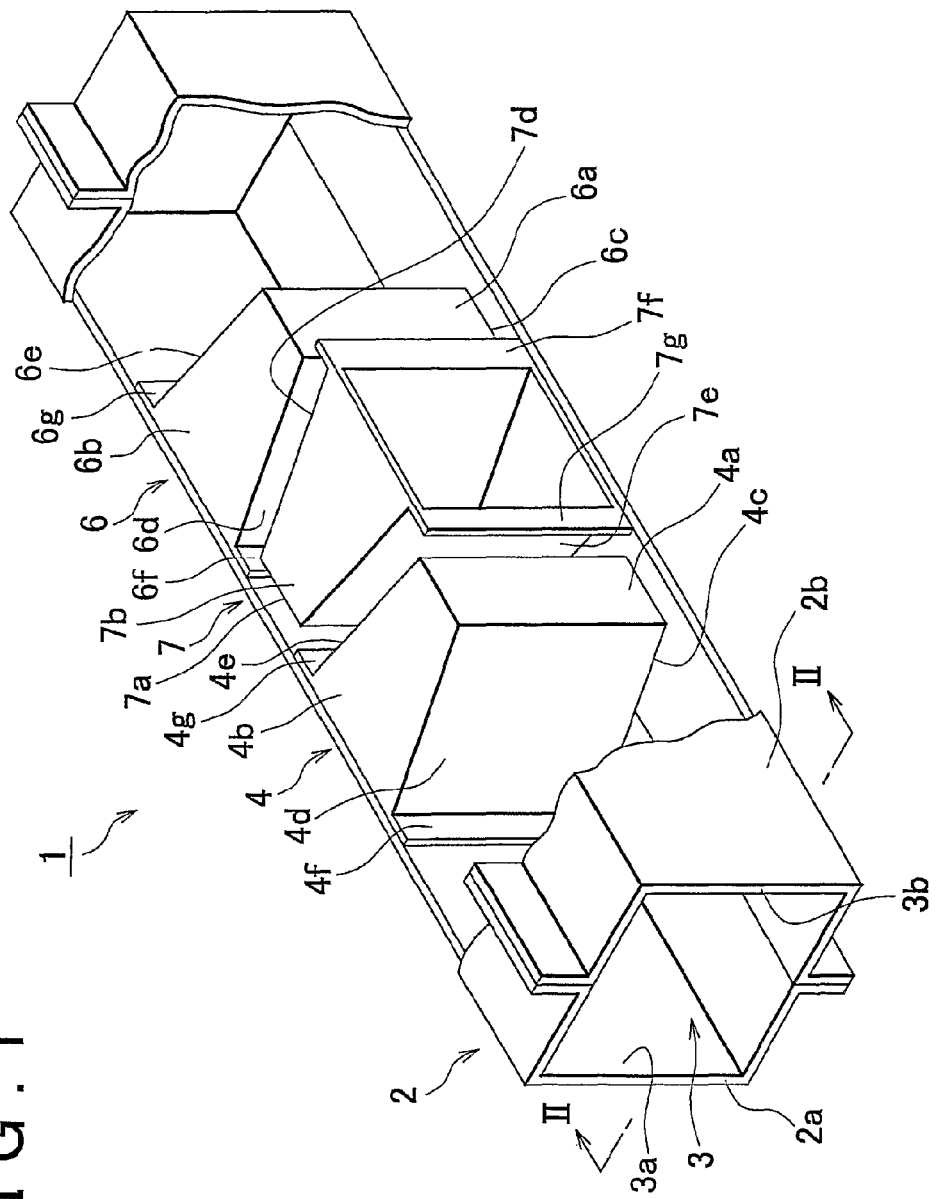

VEHICLE BODY STRUCTURE

This is a 371 national phase application of PCT/IB2007/004245 filed Dec. 13, 2007, claiming priority to Japanese patent application No. 2006-340458 filed Dec. 18, 2006, the contents of which are incorporated herein by reference.

FIELD OF THE INVENTION

The invention relates to a vehicle body structure in which components are provided in a portion that is subject to bending due to buckling, for example, at the time of vehicle collision.

BACKGROUND OF THE INVENTION

A vehicle body structure, in which reinforcement members and bulkheads are disposed on a wall surface of a structural member, is available (for example, Japanese patent application Publication No. 10-244970). In the vehicle body structure, the bulkheads are disposed facing each other, and each of the bulkheads forms a predetermined angle with respect to one longitudinal end of the corresponding reinforcement member. According to the vehicle body structure thus configured, if the structural member is bent due to buckling, for example, at the time of vehicle collision, the one longitudinal end of the reinforcement member interferes with the corresponding bulkhead, whereby inward deformation of the structural member in the vehicle is impeded.

However, in the aforementioned vehicle body structure, a space is created between the bulkhead and the one longitudinal end of the corresponding reinforcement member. Therefore, there is a possibility that the shock is not sufficiently absorbed until the bulkheads are brought into contact with the reinforcement members, and as a result, the amount of deformation of the structural member can become large.

DISCLOSURE OF THE INVENTION

The invention provides a vehicle body structure that impedes progress of bending deformation of a structural member when the structural member is bent due to buckling, for example, at the time of vehicle collision.

A first aspect of the invention relates to a vehicle body structure that includes: a structural member defining an inner space; at least two reinforcement members disposed in the inner space along a longitudinal direction of the structural member; and a load-absorbing member that is disposed between the two reinforcement members and absorbs a load applied to the reinforcement members.

According to the vehicle body structure as described above, two reinforcement members are provided in the inner space defined by the structural member so that a portion of the structural member, which portion is subject to bending due to buckling, is positioned between the two reinforcement members. Due to this configuration, even when the portion of the structural member is bent due to buckling, for example, at the time of vehicle collision, the load-absorbing member disposed between the two reinforcement members is caught therebetween, and absorbs the load applied to the reinforcement members. In this way, when the structural member is deformed, the load-absorbing member absorbs, through the reinforcement members, the load applied to the reinforcement members. Due to this configuration, the movement of the opposing surfaces of the reinforcement members toward each other is impeded by the load-absorbing member, whereby it is possible to impede progress of the deformation of the structural member.

Further, the load-absorbing member may be a bulkhead. According to the configuration, the bulkhead, which functions as the load-absorbing member, can absorb the load by being crushed between the reinforcement members. Further, the load-absorbing characteristic can be easily adjusted by changing, for example, the thickness of the steel plate or the material forming the bulkhead. In this way, the amount of deformation of the structural member can be adjusted. Further, the load-absorbing characteristic can also be adjusted by changing the angle and distance between the opposing surfaces of the reinforcement members, whereby it is made possible to adjust the amount of deformation of the structural member. Accordingly, it is possible to optimize the amount of deformation of the structural member.

Further, the load-absorbing member may be an elastic body. According to the configuration, the load-absorbing member can absorb the load through elastic deformation. In addition, the load-absorbing characteristic can be easily adjusted by changing the elastic property of the elastic body, whereby it is made possible to adjust the amount of deformation of the structural member. Accordingly, it is possible to optimize the amount of deformation of the structural member.

Further, the load-absorbing member may have a cut-away portion. According to the configuration, the load-absorbing characteristic can be easily adjusted by, for example, changing the size and shape of the cut-away portion, whereby it is made possible to adjust the amount of deformation of the structural member. Accordingly, it is possible to optimize the amount of deformation of the structural member.

In the vehicle body structure according to the invention, the structural member may be a rocker. In this case, it is possible to improve the performance in absorbing shock at the time of a side crash, etc.

According to the invention, even when the structural member is bent due to buckling, for example, at the time of vehicle collision, progress of the bending deformation is impeded. As a result, the shock produced by the vehicle collision is appropriately absorbed by the entire vehicle body, whereby it is possible to prevent a space in a vehicle compartment from being shrunk by excessive bending of the structural members.

BRIEF DESCRIPTION OF THE DRAWINGS

The foregoing and further objects, features and advantages of the invention will become apparent from the following description of exemplary embodiments with reference to the accompanying drawings, wherein like numerals are used to represent like elements and wherein:

FIG. 1 is a perspective view showing an inner structure (and a part of an outer structure) of a vehicle body structure according to a first embodiment of the invention;

DETAILED DESCRIPTION OF EMBODIMENTS

Figure 2A:
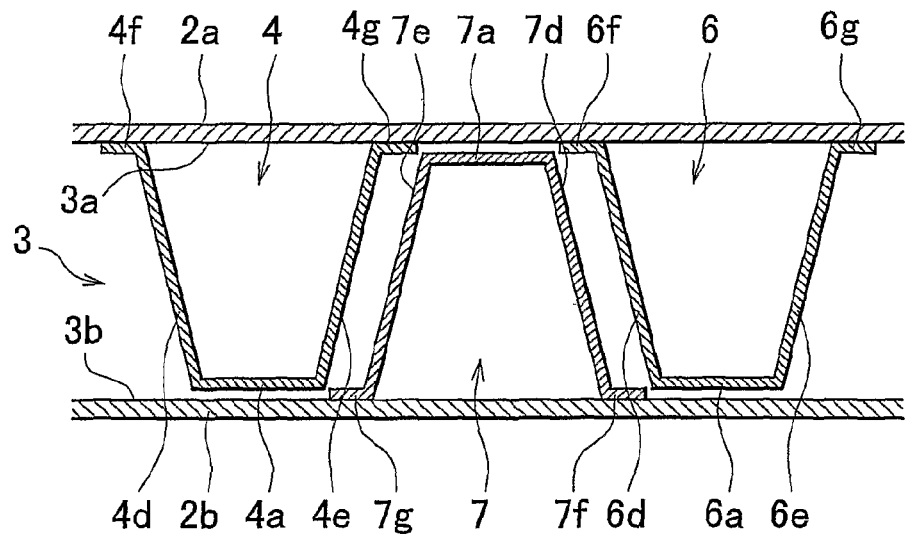
FIGS. 2A and 2B are sectional views taken along the line shown in FIG. 1, and respectively show a normal state, and the state where a rocker is bent due to buckling, for example, at the time of vehicle collision.

Embodiments of a vehicle body structure according to the invention will be described in detail below with reference to the attached drawings. The vehicle body structures according to the embodiments of the invention are applied to a rocker of a vehicle, which constitutes a part of a vehicle body. It should be noted that the same and equivalent portions in the drawings will be denoted by the same reference numerals, and the description thereof will not be repeated.

First Embodiment

FIG. 1 is a perspective view showing an inner structure (and a part of an outer structure) of a vehicle body structure 1 according to a first embodiment of the invention. As shown in FIG. 1, the vehicle body structure 1 includes: rockers (structural members) 2 that are configured in a hollow rectangular column shape; bulkheads 4, 6 (reinforcement members) provided in an inner space 3 defined by the rockers 2; and a bulkhead (load absorbing member) 7 provided between the bulkheads 4, 6 in the inner space 3.

The rocker 2 is disposed on each of the right and left sides of a vehicle floor (not shown), and extends in a longitudinal direction from a front side to a rear side of the vehicle. Each of the rockers 2 includes a pair of components whose sections are substantially U-shaped, and that are disposed facing each other to define a space therein. The U-shaped components are welded at margin portions (hereinafter referred to as "welding margins") of the U-shaped components to form one rocker 2.

A sidewall 2a of the rocker 2 is disposed on the inner side with respect the vehicle, and a sidewall 2b thereof, which is opposed to the sidewall 2a, is disposed on the outer side with respect to the vehicle. Due to this configuration, when, for example, the vehicle is hit on the side by another vehicle (side crash), the rocker 2 on the side crashed is deformed from the sidewall 2b-side toward the inside of the vehicle, resulting in bending the rocker 2 toward the inside of the vehicle. Further, the bulkheads 4 and 6 are fixed on an inner wall surface 3a of the sidewall 2a, and the bulkhead 7 is fixed to an inner wall surface 3b of the sidewall 2b.

The bulkhead 4 is formed by bending a steel plate into a trapezoidal column shape. It should be noted that the directions with respect to the bulkheads 4, 6, are described on the assumption that the sidewall 2a is the bottom, and the directions with respect to the bulkhead 7 are described on the assumption that the sidewall 2b is the bottom. A rectangular top surface wall 4a of the bulkhead 4 is in parallel opposed to the inner wall surface 3b. The top surface wall 4a includes shorter edges that are arranged along a longitudinal direction of the rocker 2, and longer edges that are arranged along a height direction of the hollow rectangular column (rocker) 2. The bulkhead 4 includes: trapezoidal sidewalls 4b, 4c perpendicularly extended from the short edges of the upper surface wall 4a toward the inner wall surface 3a in a manner that the width of the trapezoidal sidewalls 4b, 4c is gradually increased toward the inner wall surface 3a; inclined sidewalls 4d, 4e, extended from the long edges of the top surface wall 4a toward the inner wall surface 3a along the edges of the trapezoidal sidewalls 4b, 4c; and welding margins 4f, 4g extended outward from the bottom edges of the inclined sidewalls 4d, 4e. The bulkhead 4 is fixed to the inner wall surface 3a by welding the welding margins 4f, 4g to the inner wall surface 3a.

The bulkhead 6 includes a top surface wall 6a, trapezoidal sidewalls 6b, 6c, inclined sidewalls 6d, 6e, and welding margins 6f, 6g, which are all configured in the same manner as those for the bulkhead 4 described above. The bulkhead 6 is located on the inclined sidewall 4e-side with respect to the bulkhead 4 in the rocker 2. Due to this arrangement, an outer surface of the inclined sidewall 6d of the bulkhead 6 is opposed to an outer surface of the inclined sidewall 4e of the bulkhead 4 in a longitudinal direction of the rocker 2 with a predetermined angle formed between the inclined sidewall 4e and the inclined sidewall 6d.

The bulkheads 4, 6 are disposed so that a portion of the rocker 2, which portion is subject to bending due to buckling (for example, the portion in which a center pillar is provided), is positioned between the inclined sidewalls 4e and 6d.

The bulkhead 7 includes a top surface wall 7a, trapezoidal sidewalls 7b, 7c, inclined sidewalls 7d, 7e, and welding margins 7f, 7g, which are all configured in the same manner as those for the bulkheads 4, 6 described above. However, the bulkhead 7 is formed thinner than the bulkheads 4, 6 to set the strength of the bulkhead 7 lower than those of the bulkheads 4, 6. Further, the bulkhead 7 is interposed between the bulkheads 4, 6 in a manner that the top surface wall 7a faces the direction opposite to the directions that the top surface walls 4a, 6a of the bulkheads 4, 6 face. More specifically, the bulkhead 7 is fixed to the inner wall surface 3b by welding the welding margins 7f, 7g to the inner wall surface 3b, and disposed so that an inclined sidewall 7e of the bulkhead 7 is opposed to the inclined sidewall 4e of the bulkhead 4, and an inclined sidewall 7d is opposed to the inclined sidewall 6d of the bulkhead 6.

Figure 2B:
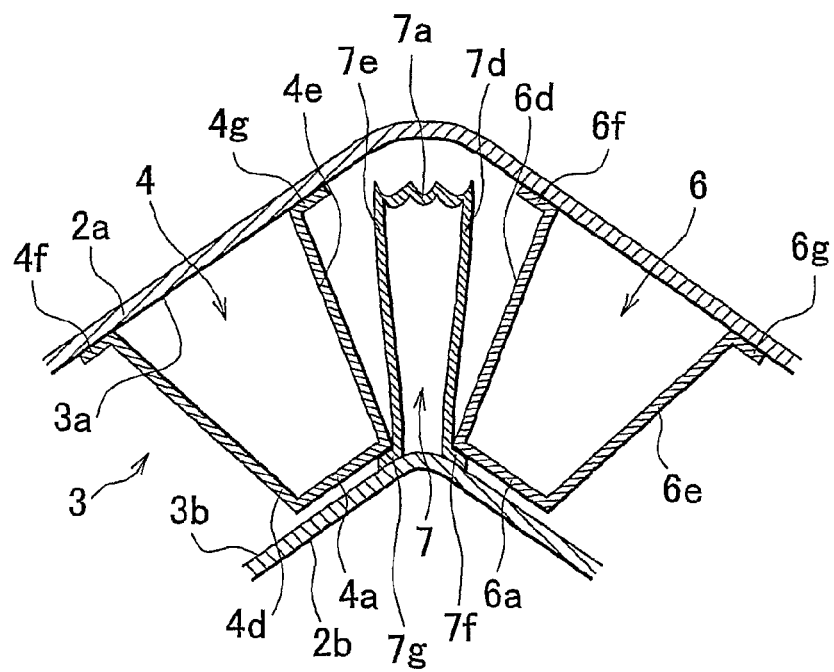

Next, the operations and effects achieved by the vehicle body structure 1 configured as described above will be described with reference to FIGS. 2A and 2B. FIGS. 2A and 2B are sectional views taken along the line II-II shown in FIG. 1. FIG. 2A shows a normal state of the vehicle body structure 1, and FIG. 2B shows a state where the rocker 2 is bent due to buckling when, for example, the vehicle is hit on the side by another vehicle.

As shown in FIG. 2A, in a normal state, the bulkhead 7 is not in contact with either of the bulkheads 4, 6. However, if the rocker 2 is bent due to buckling when, for example, the vehicle is hit on the side by another vehicle, the bulkhead 7 is caught between the inclined sidewall 4e of the bulkhead 4 and the inclined sidewall 6d of the bulkhead 6, as shown in FIG. 2B. Therefore, the movement of the inclined sidewalls 4e, 6d toward each other is impeded by the bulkhead 7. The bulkhead 7, which is produced with a lower strength, functions as a load-absorbing member, which is crushed and absorbs energy of a load (shock) produced at the time of vehicle collision. Therefore, when the rocker 2 is deformed, the load applied to the rocker 2 is absorbed by the bulkhead 7. Thus, progress of the bending deformation of the rocker 2 is impeded without using an excess number of reinforcement members.

The amount of deformation (i.e. a deformation angle) of the rocker 2 can be adjusted by changing the load applied to the bulkhead 7. The load applied to the bulkhead 7 is changed by, for example, changing the angle between the outer surface of the inclined sidewall 4e of the bulkhead 4 and the outer surface of the inclined sidewall 6d of the bulkhead 6, or changing the distance between the inclined sidewalls 4e and 6d. In this way, it is possible to optimize the amount of deformation of the rocker 2.

Further, the load-absorbing characteristic of the bulkhead 7 can be easily adjusted by changing the strength of the bulkhead 7. The strength of the bulkhead 7 is changed by, for example, changing the thickness of the steel plate and/or the material for the bulkhead 7. In this way, the amount and rate of deformation of the rocker 2 can be adjusted. Also in this way, it is possible to optimize the amount of deformation of the rocker 2.

Second Embodiment

Figure 3:
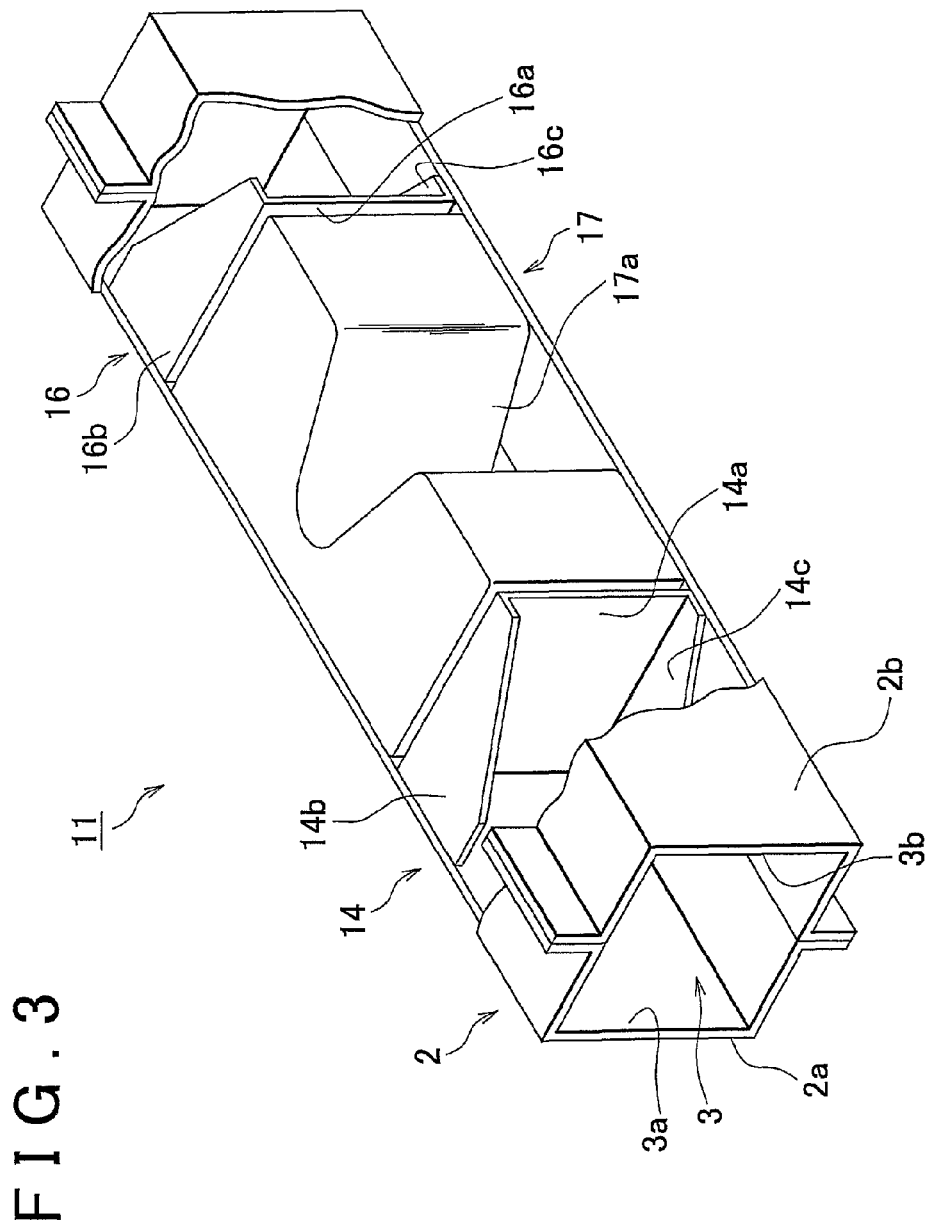
FIG. 3 is a perspective view showing an inner structure (and a part of an outer structure) of a vehicle body structure according to a second embodiment of the invention.

FIG. 3 is a perspective view showing an inner structure (and a part of an outer structure) of a vehicle body structure 11 according to a second embodiment of the invention.

In FIG. 3, the vehicle body structure 11 includes: the rocker 2 that has a configuration similar to that of the rocker 2 in the first embodiment; bulkheads 14, 16 provided in the inner space 3 of the rocker 2; and an elastic body 17 that is provided in the inner space 3 and interposed between the bulkheads 14, 16.

The bulkhead 14 is a member that is formed by bending a steel plate and has a U-shaped section. The bulkhead 14 includes: a sidewall 14a that is square or rectangular shaped and disposed perpendicular to the inner wall 3a; and sidewalls 14b, 14c that extend from upper and lower edges of the sidewall 14a, respectively, in the direction opposite to the direction of the bulkhead 16. The bulkhead 14 is fixed to the inner wall surface 3a by welding the respective edges of the sidewalls 14a to 14c to the inner wall surface 3a.

The bulkhead 16 includes sidewalls 16a to 16c, which have configurations similar to those of the aforementioned bulkhead 14. The bulkhead 16 is disposed so that the sidewall 16a is opposed to the sidewall 14a of the bulkhead 14 with the elastic body 17 interposed therebetween. The sidewalls 16b, 16c extend in the direction opposite to the direction of the bulkhead 14.

The bulkheads 14, 16 are disposed so that a portion of the rocker 2, which portion is subject to bending due to buckling, is positioned between the sidewalls 14a and 16a.

The elastic body 17 is made of a load-absorbing material, such as an epoxy resin. Further, the elastic body 17 has a substantially rectangular prism shape, and includes a cut-away portion 17a formed by cutting away a longitudinal center portion of the elastic body 17, so that the cut-away portion 17a is substantially V-shaped, that is, the width of the cut-away portion 17a is the widest on the inner wall surface 3b-side and decreases toward the inner wall surface 3a-side.

In the vehicle body structure 11 configured as described above, if the rocker 2 is bent due to buckling when, for example, the vehicle is hit on the side by another vehicle, the elastic body 17 is caught between the side wall 14a of the bulkhead 14 and the side wall 16a of the bulkhead 16. When this occurs, the elastic body 17 absorbs the load through elastic deformation, functioning as the load-absorbing member. Thus, progress of the bending deformation of the rocker 2 is impeded. Further, the load-absorbing characteristic can be easily adjusted by changing the elastic property of the elastic body 17, whereby it is made possible to optimize the amount and rate of deformation of the rocker 2.

Figure 4:
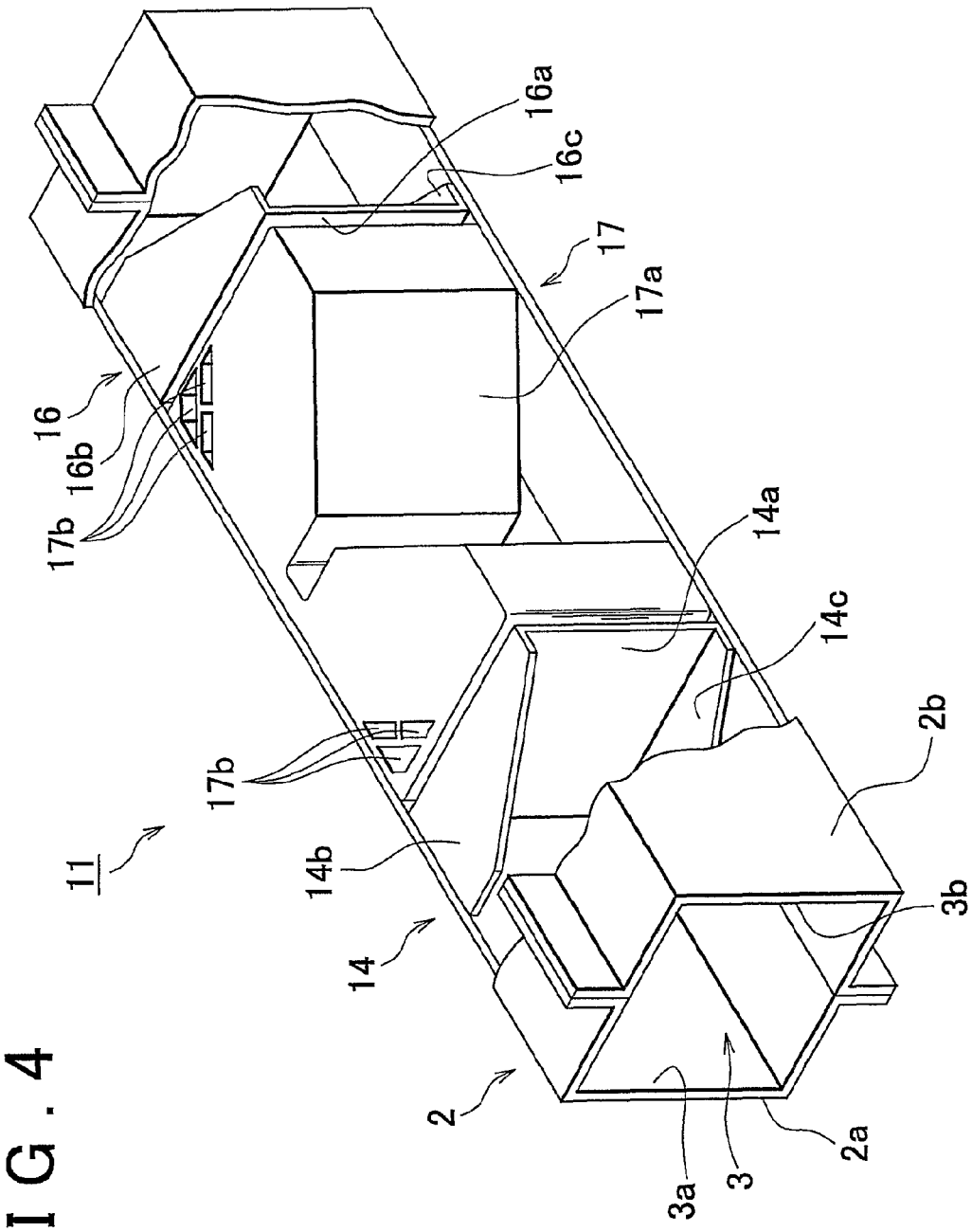
FIG. 4 is a perspective view showing an inner structure (and a part of an outer structure) of a vehicle body structure according to a modification example of the second embodiment.

It should be noted that the configuration of the elastic body 17 is not particularly limited to the configuration shown in FIG. 3. The load-absorbing characteristic of the elastic body 17 may be changed by changing the strength of the elastic body 17 by, for example, changing the size and shape of the cut-away portion 17a and forming a given number of through holes 17b at selected positions of the elastic body 17, as shown in FIG. 4.

Figure 5:
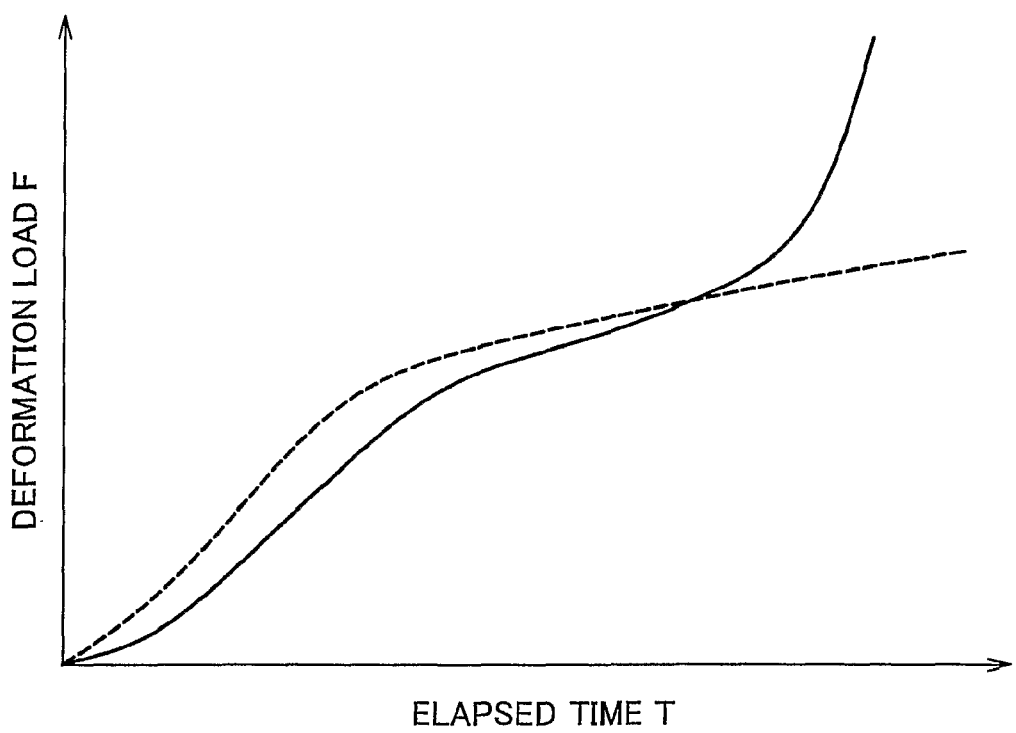
FIG. 5 is a diagram showing a relation between elapsed time T indicating the time that has elapsed since the start of deformation and deformation load F applied to an elastic body when the rockers shown in FIGS. 3 and 4 are bent and deformed due to buckling.

FIG. 5 is a diagram showing a relation between elapsed time T indicating the time that has elapsed since the start of deformation and deformation load F applied to the elastic body 17 when the rocker 2 is bent and deformed due to buckling. The solid line indicates characteristics of the vehicle body structure 11 shown in FIG. 3, and the dotted line indicates characteristics of the vehicle body structure 11 shown in FIG. 4. As shown in FIG. 5, in the vehicle body structure 11 configured as shown in FIG. 3, the deformation load gradually increases for a certain period after the start of deformation, and the rate of increase in the deformation load becomes higher as time passes. By contrast, in the vehicle body structure 11 configured as shown in FIG. 4, the rate of increase of the deformation load is high immediately after the start of deformation, and the deformation load gradually increases thereafter.

As described above, the load-absorbing characteristic of the elastic body 17 can be easily adjusted by changing the size and shape of the cut-away portion 17a, or changing the number and size of the through holes 17b. This makes it possible to optimize the amount and characteristics of deformation of the vehicle body structure 11 depending on the types of vehicle.

The invention is not limited to the aforementioned embodiments.

For example, according to the aforementioned embodiments, one set of the bulkheads and the load-absorbing member is provided in one portion of the rocker 2. However, a plurality of sets each including the bulkheads and the load-absorbing member may be provided in the respective portions of the rocker 2.

In the embodiments, the vehicle body structure according to the invention is applied to the rocker. However, the vehicle body structure may be applied to any portions of the vehicle body, which portions are subject to deformation by bending, such as a roof rail, a front side member, and a bumper reinforcement.

The invention claimed is:

1. A vehicle body structure, comprising:
   a structural member defining an inner space;
   at least two reinforcement members disposed in the inner space of the structural member along a longitudinal direction of the structural member; and
   a load-absorbing member that is disposed between the two reinforcement members and absorbs a load applied to the reinforcement members, wherein:
   each of the reinforcement members has a side surface facing the load-absorbing member and is arranged so that, when an external force is applied to the structural member and the structural member is deformed, the side surface of each of the reinforcement members is brought into contact with the load-absorbing member and applies a pressure to the load-absorbing member;
   the load-absorbing member has a side surface facing the side surface of one of the reinforcement members, a side surface facing the side surface of the other of the reinforcement members, and a connecting surface that connects the two side surfaces of the load-absorbing member; and
   the structural member, the reinforcement members, and the load-absorbing member are arranged so that, when the external force is applied to the structural member and the structural member is deformed, one of the side surfaces of the load-absorbing member is brought into contact with the side surface of the one of the reinforcement members, the other of the side surfaces of the load-absorbing member is brought into contact with the side surface of the other of the reinforcement members, and the connecting surface of the load-absorbing member is deformed to absorb a shock;

wherein the load-absorbing member has a strength lower than the reinforcement members;

wherein the structural member includes two parts that face each other;

wherein the reinforcement members are provided on one of the two parts; and wherein the load-absorbing member is provided on the other of the two parts.

2. The vehicle body structure according to claim 1, wherein the load-absorbing member is an elastic body and has a cut-away portion at the connecting surface.

3. The vehicle body structure according to claim 1, wherein:

one of the side surfaces of the load-absorbing member and the other of the side surfaces of the load-absorbing member are inclined with respect to each other so as to form a tapered shape; and the side surface of the one of the reinforcement members and the side surface of the other of the reinforcement members are inclined with respect to each other so as to form a tapered shape.

4. The vehicle body structure according to claim 1, wherein the load-absorbing member is a bulkhead.

5. The vehicle body structure according to claim 1, wherein:

one of the side surfaces of the load-absorbing member and the other of the side surfaces of the load-absorbing member are inclined with respect to each other so as to form a tapered shape; and the side surface of the one of the reinforcement members and the side surface of the other of the reinforcement members are inclined with respect to each other so as to form a tapered shape.

6. The vehicle body structure according to claim 1, wherein the structural member is a rocker.

7. The vehicle body structure according to claim 1, wherein:

a sidewall of the load-absorbing member has a trapezoidal shape; and said side surfaces of the two reinforcement members are disposed substantially parallel to the respective surfaces of the load-absorbing member.

* * * * *